United States Patent [19]

Thode

[11] Patent Number: 5,390,846

[45] Date of Patent: Feb. 21, 1995

[54] WELDING GAS PURGING APPARATUS AND METHOD

[76] Inventor: Jonathan E. Thode, R.R. 2, Box 665, Brockway, Pa. 15824

[21] Appl. No.: 105,495

[22] Filed: Aug. 11, 1993

[51] Int. Cl.⁶ .............................................. B23K 9/16
[52] U.S. Cl. ....................................... 228/219; 228/8; 228/42; 219/74
[58] Field of Search ................. 228/219, 102, 8, 42, 228/44.5, 49.3; 219/72, 74, 60 A, 651

[56] References Cited

U.S. PATENT DOCUMENTS

| | | | |
|---|---|---|---|
| 2,802,092 | 8/1957 | Hauck | 219/61 |
| 2,819,517 | 1/1958 | Pursell | 29/483 |
| 3,194,466 | 7/1965 | Davis | 228/42 |
| 3,387,761 | 6/1968 | Pickard | 228/42 |
| 4,101,067 | 7/1978 | Sloan et al. | 228/219 |
| 4,528,436 | 7/1985 | Stol | 219/74 |
| 4,828,160 | 5/1989 | Sundholm | 228/42 |
| 4,916,281 | 4/1990 | Flasche et al. | 219/61 |
| 5,100,043 | 3/1991 | Hallenbeck | 228/42 |
| 5,187,343 | 2/1993 | Edwards | 228/219 |
| 5,235,152 | 8/1993 | Jankus | 219/74 |

FOREIGN PATENT DOCUMENTS 60-221174 11/1985 Japan .................................. 219/74
63-215375 9/1988 Japan .
1323318 7/1987 U.S.S.R. .

OTHER PUBLICATIONS

"Damming Process Pipework for Gas Purging", *Process Engineering*, p. 57 (Aug. 1989).

*Primary Examiner*—Samuel M. Heinrich
*Attorney, Agent, or Firm*—Rod D. Baker

[57] ABSTRACT

An apparatus and method for purging reactive gases from the vicinity of a molten weld during the welding process, having particular application to the welding of industrial process piping systems and pipelines, especially stainless steel and other alloy pipelines. A system is disclosed for boosting purging speed and efficiency by providing a multidirectional flow of purging gas adjacent to the interior walls of the pipe sections being joined. The rate of purge gas flow is automatically adjusted in response to changing gas pressures in the vicinity of the progressing weld.

39 Claims, 7 Drawing Sheets

WELDING GAS PURGING APPARATUS AND METHOD

A portion of the disclosure of this patent document contains material which may be subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention (Technical Field):

The invention relates to an apparatus and method for performing gas purging during metallurgical welding, particularly for purging the interior of industrial process piping systems and pipelines during welded assembly.

2. Background Art:

In fabricating welded joints in alloy piping, it is extremely desirable to exclude reactive gases from the heated weld area in order to minimize detrimental metallurgical and chemical alterations in the metal alloy. Welds performed in the presence of reactive gases tend to cause metallurgic transformations which adversely affect the strength and corrosion resistance of many alloy materials. For this reason, various efforts have been made to devise systems and methods for purging reactive gases, such as oxygen and nitrogen, from the weld area during fabrication.

The need for gas purging extends to the welded fabrication of alloy steel pipes. The standard techniques for excluding reactive gases from the region of the weld on the exterior of the pipe are the use of Gas-Tungsten Arc Welding (GTAW) or the use of Gas-Metal Arc Welding (GMAW). With these methods, the arc and the immediate vicinity of the progressing weldment on the pipe exterior are purged of reactive gases by a blast of inert gas, such as argon, from an outlet on the welder's torch. To protect the interior side of the weldment, a section of the pipe adjacent to the weld is blocked off with purge dams, one dam each on either side of the weld. The blocked-off section of the pipe is filled with inert gas from a single injection source, to purge the interior of the pipe of reactive gases.

In the current practice, it is typical to admit argon into the enclosed section of pipe through one of the purge dams and vent it through the joint to be welded and/or a vent in one of the purge dams. Since the gap between the two pieces of pipe to be joined initially presents a significantly large area through which admitted argon can escape, the entire circumference of the gap save a small hole is temporarily covered with tape while the interior of the pipe is purged of air. Subsequent to a determination that the oxygen concentration within the interior of the pipe is within acceptable limits, the welder opens up a segment of the tape (usually one fourth the pipe circumference or less) and begins to apply the first pass of weld metal (the "root bead").

In the existing art, the argon purge flow rate usually is uncontrolled or poorly controlled. Frequently, the only purge gas discharge control is the simple expedient of employing a pressure regulator on the inert gas source. Such rudimentary control presents serious problems, for if the gap being closed is wide enough, removing tape to open any arcuate segment of the gap can result in reactive air being drawn into the pipe interior. On the other hand, inert gas pressures required to maintain an outward flow through the gap from inside the pipe are likely to be high enough to deform the molten weld metal, especially when closure is approached near the completion of the circumferential weld. Such deformations, which typically are discovered only after X-ray testing, unacceptably impact the quality of the weld.

U.S. Pat. No. 2,819,517 to Pursell, entitled *Method of Welding Pipe Ends Together*, discloses the use of an exterior pressure regulator at the source of the purge gas, purportedly to avoid over-pressurizing the purged chamber in the pipe. No means for reducing pressures to avoid weldment distortion during closure are disclosed, and there is no teaching of inflatable sealing rings or specialized directional flows.

U.S. Pat. No. 2,802,092 to Hauck, entitled *Method and Apparatus for Welding*, shows a purge dam apparatus and method requiring that a survey hole be drilled through the pipe wall, through which purge gas is introduced. Survey holes such as those taught by Hauck are banned by modern codes; no pressure sensors or specialized directional flows are disclosed.

U.S. Pat. No. 4,916,281 to Flasche et al., entitled *Gas Back-Purging During Welding of Pipe*, teaches control of a gas back purging process to maintain a constant gas flow and a constant ratio of torch "shielding" gas to purge "backing" gas. No specialized bidirectional flows are suggested.

Soviet Union Patent No. SU 1323-318-A to Volodkin discloses a weld protection device provided with a pressure sensor to assure constant gas pressure. Japanese Patent No. JA 0215375 shows a "roll-out" welder for use in the workshop or factory environment. The flow of inert gas is controlled according to the pressure of the gas in a closed space. A single valve is utilized, which may result in unacceptably large pressure and discharge surges during operation. No bidirectional flow is indicated.

An article found on page 57 of the August, 1989, issue of *Process Engineering* magazine contains a succinct discussion of various reasons and modes known in the art for performing gas purging during piping systems welding.

Nevertheless, a need remains for a method and apparatus for maintaining an inert gas pressure inside the pipe and an inert gas flow rate which are adequate to prevent incursion of reactive gases at any stage of weldment completion, yet low enough to prevent distortion of the molten weld metal as completion is approached, and which are so directed as to give uniform, high-quality welds throughout the length of the abutment circumference. Likewise, there is a need for a more efficient and orderly delivery of inert gas to the vicinity of the weld, as opposed to a single point source injection into the enclosed pipe interior.

SUMMARY OF THE INVENTION (DISCLOSURE OF THE INVENTION)

The invention relates to a method and apparatus for accomplishing gas purging during welding, particularly during the welding of industrial process piping systems. A system is disclosed whereby an interior space within a section of piping system to be welded is sealably closed using one or more gas dams, which may be inflatable, disposed within the pipe. A means and method are disclosed for bidirectionally injecting purge gas into the interior space from locations on either side of the weldment, thereby improving purging efficiency. The gas dams are configured to direct the flow of purge gas along the faces of the inside walls of the pipe, which maintains favorable chemical stoichiometry at the weldment location while reducing consumption of inert gas and minimizing deleterious turbulence within the interior space.

A principal object of the invention is to maintain a purge gas pressure within the interior space by using a flow rate of purge gas which is adequate to prevent incursion of reactive gases at any stage of weldment completion, yet low enough to prevent distortion in the molten weld metal. This is accomplished by disposing a pressure sensor line within the interior space and automatically and incrementally adjusting the flow of purge gas therein as the weldment is progressively closed.

An apparatus and method for maintaining a controlled purge gas flow comprises a programmable control unit in communication with the interior space via a pressure sensor line. Particular preselected pressure "threshold" values, or "set points," are programmed into the control unit. Detection of various threshold pressure values actuates valves disposed in inert gas supply lines. Inert gas is supplied to the interior space through a system of valve lines; each valve line is connected to the control unit by an output lead, which may include a relay assembly which actuates a solenoid valve on each valve line. As the pressure sensor line in the interior space detects conditions of pressure corresponding to the various threshold pressure values preprogrammed into the control unit, signals are emitted from the control unit to activate solenoid valves to open and close corresponding valve lines, thereby incrementally adjusting ongoing purge gas flow.

A primary object of the present invention is to provide a means and method for reducing the amount of time to accomplish, and for increasing the thoroughness of, a purging blow down in a pipe to be welded.

Another object of the invention is to provide a means and method for directing the stream of flow during gas purging to reduce inert gas consumption and improve weldment quality.

Still another object of the invention is to provide a means and method for adjusting the flow of purge gas during welding in response to changing conditions of purge gas pressure in the vicinity of the weld, in order to enhance weldment quality.

A primary advantage of the present invention is that it provides a means and method for providing bidirectional flow of purge gas in a pipe to be welded.

Another advantage of the present invention is that it provides a means and method for directing purge gas flow along the boundary layer on the inside face of a pipe to be welded, thereby increasing the efficiency of inert gas usage.

Still another advantage of the present invention is that it provides a means and method for sensing pressure conditions in the vicinity of a weld and for signalling and performing automatic adjustments in purge gas flow in response to changes in purge gas pressure near the weld.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The invention relates to an apparatus and method for performing gas purging during metal welding procedures. More particularly, the invention provides a means and method for purging reactive gases from the vicinity of the weldment during the welded assembly of pipes, especially alloy steel pipes.

Stainless steel and other alloy pipes are widely used in steam-electric power plants, petroleum refineries and chemical plants, and in the food, pharmaceutical and pulp/paper industries. It is well known in the art that in fabricating welded joints in alloy steel pipe, it is practically essential that reactive gases such as oxygen be entirely excluded from the heated weld area—both on the inside as well as the outside of the pipe. The present invention allows the user to perform such exclusion, or "purging," in a controlled and efficient manner. The control permits maintenance of inert purge gas flows and pressures at optimum levels to maintain the quality of the weld, despite the decreasing length of open gap through which purge gas may be vented as the weldment progresses around the circumference of the abutment between pipe sections.

The invention finds ready application in the welded assembly of six- to twenty-inch alloy pipes where long joint life is required under corrosive conditions or in difficult repair circumstances. The invention has utility in pipe diameters under six inches, but time savings by a careful, well-trained welder may not be as great as with larger diameter pipes. For pipes exceeding twenty inches in diameter, considerable savings in time and argon may be realized in the course of conducting the initial purge. If significant oxidation of the metal occurs on the inner side of the weld joint, large pipe diameters permit manual inspection and back-welding of the root; such back-welding does not assure, however, that embrittled metal has been annealed or that the sensitizing effects of carbon precipitation have been avoided. Use of the present invention reduces the need for such rework, producing an overall savings in labor and a higher quality fabrication.

The invention is also useful, however, for welding all sizes of pipes and other shapes of materials in which an inert, or oxygen-free, or other controlled gaseous environment is desired. The discussion herein is directed to round pipes, but the invention can be modified to accommodate practically any pipe cross-sectional shape by adapting the preferred disc, annular/toric, and cylindrical shapes of the invention to the shape or size of the pipe or object.

All commercial and industrial plants having corrosive or sensitive fluid piping systems may benefit from the practice of the invention, both in new construction and in the course of shutdown repairs. Potential applications include: Class I and II and some Class III piping in nuclear powerplants, which are very costly in manhours to repair; cryogenic lines; vinyl chloride and acrylonitrile units; chlorinated hydrocarbon plants, and smelters. Other potential applications are pharmaceutical manufacturing plants, pulp mills, acid plants, and the flue-gas recovery units of coal-fired power plants and waste incinerators. In the nuclear industry, the invention has the potential to greatly reduce the time of radiation exposure of repairpersons and thus overall costs.

Figure 1:
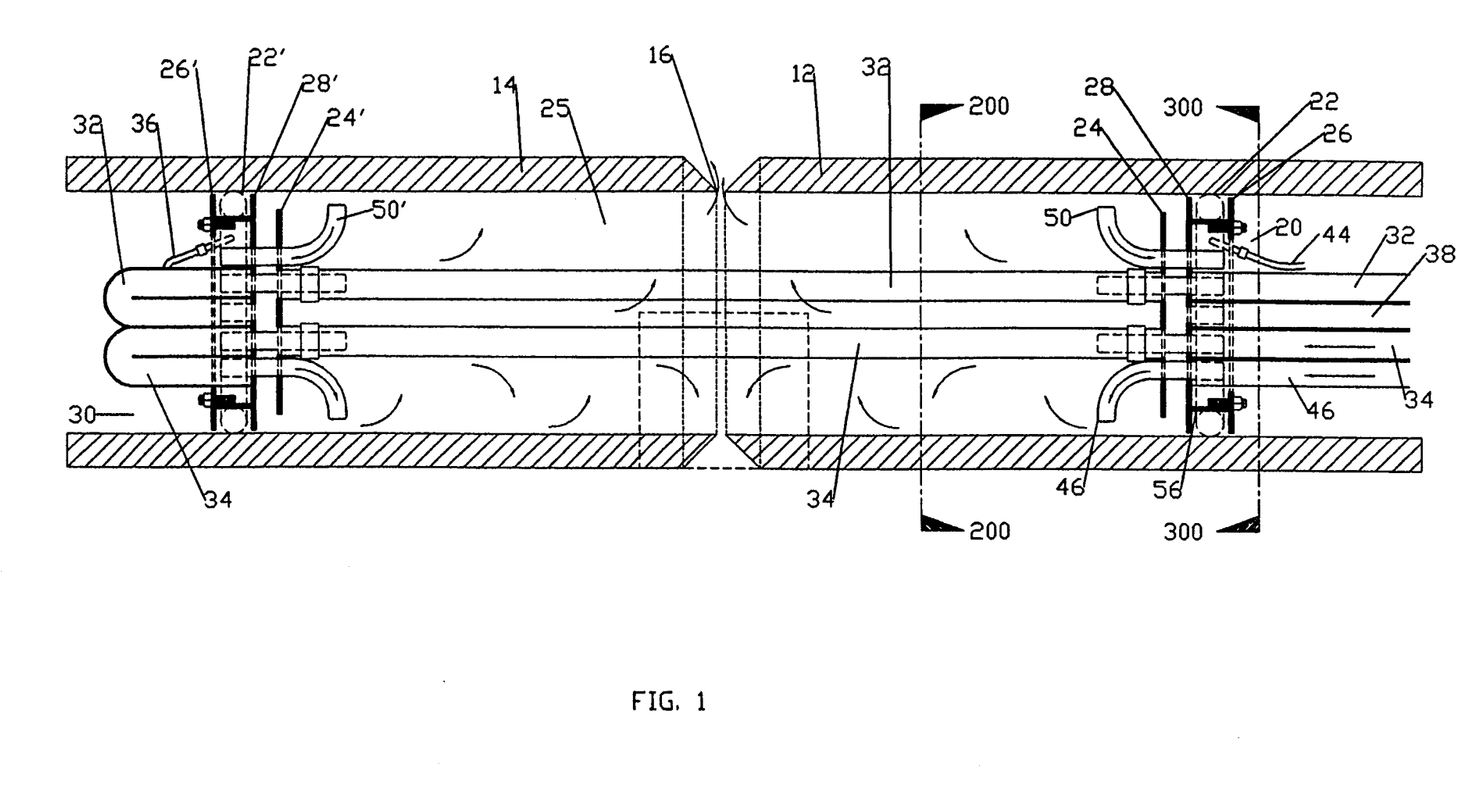
FIG. 1 is a left side sectional view of the preferred embodiment of the apparatus of the invention, showing a front purge dam and a rear purge dam, and related elements, disposed inside pipe segments during the blow down phase of the practice of the invention.
Figure 2:
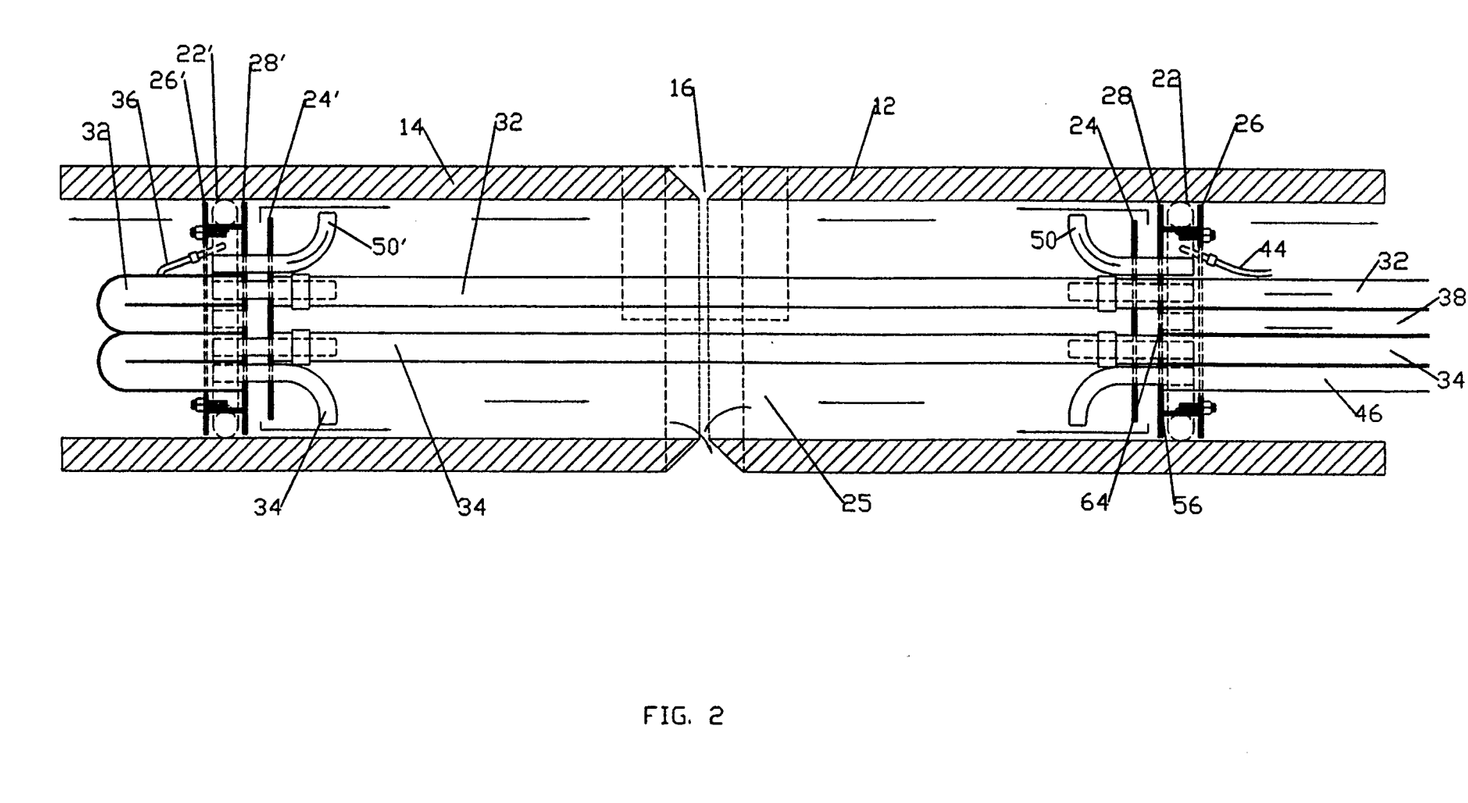
FIG. 2 shows the FIG. 1 embodiment during the controlled purge phase of the process of the invention.
Figure 3:
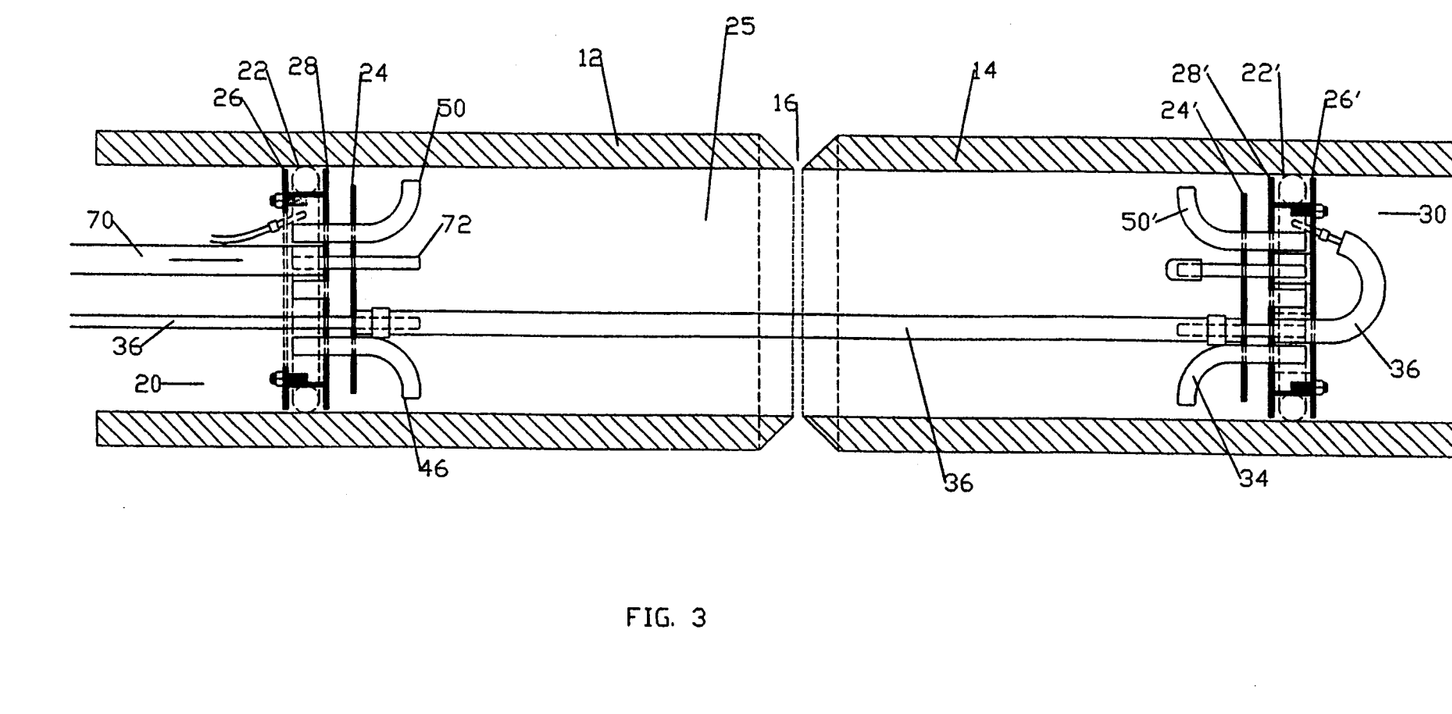
FIG. 3 is a right (opposite) side sectional view of the FIG. 1 embodiment, showing related elements not illustrated in FIG. 1 but omitting certain elements illustrated in FIG. 1.

Combined reference is made to FIGS. 1–3, illustrating the use of the apparatus of the invention in the course of joining two straight, collinear lengths of pipe, front pipe 12 and rear pipe 14. Prior to welding, pipes 12 and 14 are adjacently situated to be separated by a small (e.g. ⅛ inch) gap 16 which is to be closed by the weldment. With appropriate adaptation, the invention may be satisfactorily practiced at the open ends or closed ends of pipeline being welded. "Open end" means the segment of pipe being welded is comparatively short and is not being attached to an extended length of piping, so that access to the interior of the segment of pipe may be readily had at either of its ends. "Closed end" means a segment of pipe (e.g. front pipe 12) is being attached to the terminus of an extended length of pipe (e.g. rear pipe 14 has already been welded to the body of a line), so that access to the segment's interior may be readily had only at the end of the segment being attached. The invention may be practiced even if immediate access to both ends of both segments being joined is possible (i.e. "open-open" configuration). For purposes of description, and not by way of limitation, the following specification pertains to the frequently encountered "open-closed" configuration, where an open front pipe 12 is manipulated into place to be joined to a fixed, closed rear pipe 14 (which forms the terminus of a pre-established line of pipe, and whose end opposite the gap 16 is already joined to another length of pipe).

The invention may be practiced on virtually any size pipe, but preferably upon pipes having at least a three-inch inside diameter. Rigid elements of the apparatus of the invention preferably are composed of stainless steel or other metal tubing and/or plates; flexible elements are preferably comprised of silicone rubber or similar flexible inert rubber, plastic, or other elastomeric materials.

As shown in FIGS. 1–3, the apparatus of the invention includes the use of a front dam 20 and a rear dam 30. Front dam 20 is disposed within the interior of front pipe 12, while rear dam 14 is disposed within the interior of rear pipe 14. It will be understood by those skilled in the art that matters of convenience suggest the respective placement of front dam 20 and rear dam 30; because front dam 20 is connected to various gas lines leading to gas sources outside the pipeline, it is most conveniently placed within the open-ended front pipe 12 in an "open-closed" system. The invention may be used within two lengths of pipe that are being non-collinearly joined, that is, front dam 20 and rear dam 30 may be installed on opposite sides of an angled elbow fixture or on opposite sides of an angled abutment joint. The invention could also find application when welding a straight length of pipe to a tee joint or a wye joint.

Front dam 20 and rear dam 30 are of very similar construction; Description of front dam 20 shall serve to describe most of the aspects of rear dam 30, as the two dams are functional analogues, subject to certain expedient differences that shall shortly be specifically described or become apparent. Dams 20 and 30 are disposed on either side of gap 16 so as to enclose the interior space 25 which is to be purged of reactive gases. Dams 20 and 30 are selected to have sizes or diameters just less than the inside diameter of pipes 12 and 14. Each dam is fitted with an inflatable seal ring 22, similar to a small "inner tube," which allows a sealed contact between the dam and the inside wall of pipe 12. With seal rings 22,22' in a deflated condition, dams 20,30 are positioned within the respective lengths of pipe 12,14. Dams 20,30 may be pushed or towed into position; in the preferred embodiment, various gas lines 32,34,36 connecting front dam 20 with rear dam 30 are sufficiently flexible to pass around ninety-degree elbow joints, but stiff enough to permit rear dam 30 to be "fished" into position by manipulation of front dam 20, if necessary. With dams 20,30 in position, seal rings 22,22' are inflated with pressurized gas (preferably inert gas, e.g. argon or helium), causing them to expand against the inside pipe wall. With seal rings 22 in sealed contact with pipes 12 and 14, dams 20,30 act to "dam" or block off interior space 25 from the interiors of the remaining portions of pipes 12 and 14. Throughout this specification and unless otherwise specified, "inside" shall have reference to processes and features occurring within enclosed interior space 25 or on the faces of dams 20 and 30 affronting space 25.

Dams 20 and 30 each obtain structural rigidity from three disk-like, mutually parallel plates. These plates are rigidly connected in series, as generally shown in FIGS. 1–3 and depicted in greater detail in FIG. 6. The inside plates, denominated the director plates 24,24', are solid except for holes permitting the passage of gas lines 32,34,36 and vents 50,50' therethrough. The annular outside plates are retainer plates 26,26'. Intermediately disposed between retainer plates 26,26' and director plates 24,24' are bulkhead plates 28,28'. The respective distances between bulkhead plates 28,28' and director plates 24,24' and between bulkhead plate 28,28' and retainer rings 26,26' depend upon the size of the dam (which in turn depends upon the inside diameter of the particular pipe in which it is to be used). In a dam designed for use within an six-inch pipe, director plate 24 is relatively close (e.g. ½ inch) to bulkhead plate 28, while retainer plate 26 may be set off from bulkhead plate 28 a somewhat greater distance (e.g. 5/4 inch to 5/2 inch) in order to accommodate the placement of seal ring 22 between retainer ring 26 and bulkhead plate 28. Director plates 24,24', retainer plates 26,26', and bulkhead plates 28,28' all have outside diameters slightly less than the inside diameter of the pipe.

Figure 4:
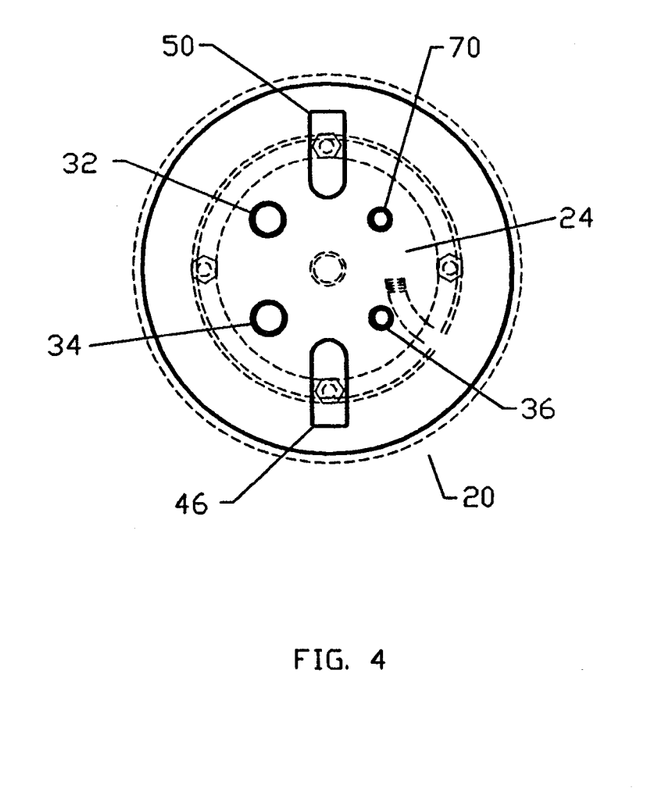
FIG. 4 is a rear view of the front purge dam element of the FIG. 1 embodiment, taken from line A—A on FIG. 1.
Figure 5:
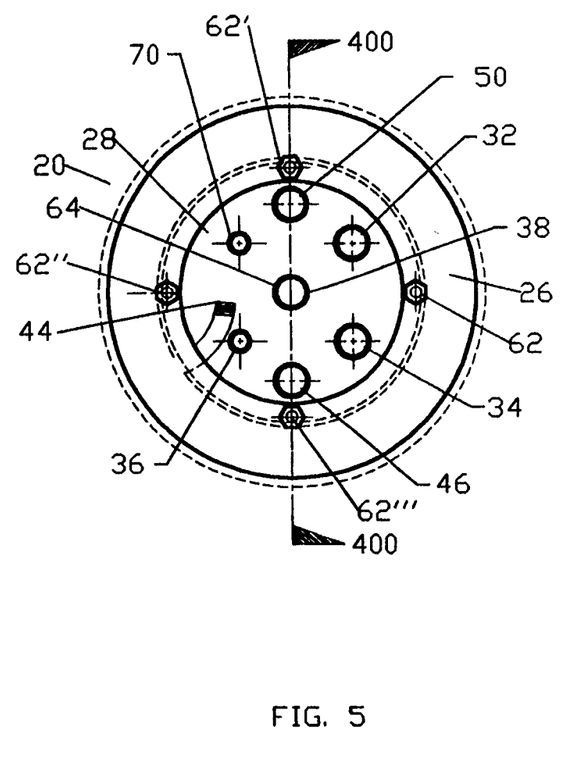
FIG. 5 is a front view of the front purge dam element of the FIG. 1 embodiment, taken from line B—B on FIG. 1.
Figure 6:
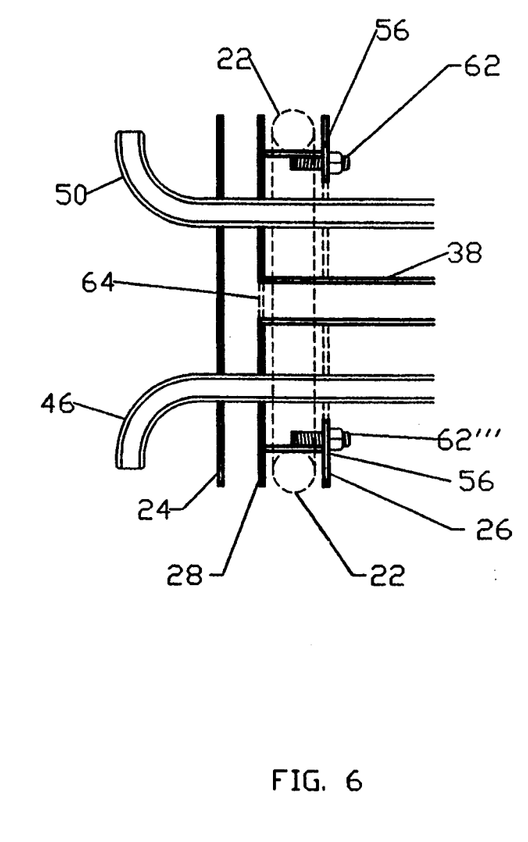
FIG. 6 is a sectional view of the FIG. 4 embodiment, taken from line C—C on FIG. 5.

FIGS. 4–6 illustrate the configuration of front dam 20 in detail; rear dam 30 is similarly configured. Bulkhead plate 28 is a solid planar disk forming the foundation of the dam 20. Front purge line 38, rear purge line 32, front blow down line 46, rear blow down line 34, vent 50 and rear dam inflation line 36, as well as vent 50, all pass through bulkhead plate 28. All lines 32,34,36,38 and 46 preferably are composed of rigid metal conduit in the vicinity of the dams 20,30 and serve to inflexibly connect director plates 24,24' to bulkhead plates 28,28'. Alternatively, director plates 24,24' may be connected to bulkhead plates 28,28' by stiff posts.

The various lines 32,34,36,38 and 46 preferably are rigidly attached to bulkhead plate 28 at the points of penetration, and the penetration sealed to prohibit gas from leaking between the outside of the lines and bulkhead plate 28. As shown in FIG. 5, front purge line 38 preferably pierces bulkhead plate 28 at its center, while the various other lines pierce plate 28 at locations radially outward from its center. The "outside" ends of front purge line 38 and rear purge line 32, (the ends terminating exteriorly of interior space 25) are connected to a supply line 84' (FIG. 7) which in turn ultimately leads to a source of pressurized inert gas. The outside ends of blow down lines 34,46 also are valvably connected to a source of pressurized inert gas.

Director plates 24,24' are an important feature of the apparatus of the invention. Each director plate 24 is a solid disc preferably having a diameter between eighty percent and ninety percent of the inside diameter of the pipe. When the dam 20 is properly and coaxially positioned within the pipe, therefore, an annular gap remains between the periphery of the director plate 24 and the inside wall of the pipe. This passage permits gas to flow from the volume between director plate 24 and bulkhead plate 28 into interior space 25 as shown by the directional arrows in FIG. 2.

Director plate 24, like bulkhead plate 28, is penetrated at various places by the various gas lines 32,34,36,and 46. The gas lines are rigid and securely attached (e.g. tack welded) to the director plate 24 at the points of penetration, and the penetration sealed (to prevent leakage of gas between the outside of the lines and director plate 24). Importantly, FIG. 6 illustrates that front purge line 38 does not penetrate director plate 24, but rather terminates in an open orifice 64 after passing through bulkhead plate 28. Front dam inflation line 44 also does not reach director plate 24, but rather terminates at seal ring 22.

As shown in FIGS. 5 and 6, retainer plate 26 is a planar annulus having a central, preferably circular, opening through which pass the pressure sensor line 70, front purge line 38, rear purge line 32, the front dam inflation line 44, the rear dam inflation line 36, the front blow down line 46, and the rear blow down line 34. As indicated in FIG. 5, the various lines pass through the aperture in retainer plate 26 and then penetrate bulkhead plate 28. The principal function of retainer plate 26 is to retain and protect seal ring 22, especially after seal ring 22 has been inflated.

Seal rings 22,22' are toroidal inflatable bladders made of an elastic material, such as rubber. Pressurized, preferably inert, gas to inflate front seal ring 22 is controllably supplied through front dam inflation line 44, while rear seal ring 22' is separately and controllably supplied with pressurized inert gas through rear dam inflation line 36. Toroidal seal rings, as opposed to spherical bladders, present the advantage of allowing various gas lines to transit through their annuli without interfering with the seal.

As best shown in FIG. 6, attached to the outside of bulkhead plate 28, is support rim 56. Each support rim 56 is a short hollow cylinder permanently attached perpendicularly to the outside face of bulkhead plate 28. Support rim 56 preferably has an outside diameter only somewhat larger than the diameter of the central aperture in retainer plate 26 and approximately equal to the inside diameter of seal ring 22; the various gas lines 32,34,36,38 and 46 passing through the hole in retainer plate 26 also pass through the interior of support rim 56 en route to their sealed intersection with bulkhead plate 28, while front dam inflation line 44 connects to an inflation stem on seal ring 22. Support rim 56 acts similarly to the mounting rims of automobile and other vehicle wheels, e.g., it restricts the radial inward expansion of inflatable seal ring 22, so that upon being inflated, seal ring 22 expands mostly outward to make a reliable contact seal with the inside of the pipe.

Permanently attached to support rim 56, as shown in FIGS. 5 and 6, are a plurality (preferably at least four) of retainer plate studs 62,62',62",62"' used to temporarily connect retainer plate 26 to support rim 56. Studs 62,62',62",62"' preferably are threaded bolts. Each plate stud 62 is welded or otherwise securely attached to the distal edge (e.g. opposite from junction with bulkhead plate 28) of support rim 56 so as to extend a short distance beyond the outside edge of the rim 56 perpendicularly to the face of bulkhead plate 28. Retainer plate studs 62,62',62",62"' preferably are mounted within the interior of rim 56 so as not to interfere with the expansion of seal ring 22.

After an uninflated seal ring 22 has been installed circumferentially around support rim 56 and against bulkhead plate 28, retainer plate 26 is removably yet securely attached to rim 56 using retainer plate studs 62,62',62",62"'. Studs 62,62',62",62"' are inserted through corresponding holes through retainer plate 26, and retainer plate 26 is slipped along the studs until it is bottomed against rim 56. Nuts are then screwed down the studs and against retainer plate 28 to secure plate 26 in place against rim 56 and parallel to bulkhead plate 28. It is observed, therefore, that inflatable seal ring 22 is enclosed and protected by bulkhead plate 28 on the inside, by support rim 56 along the inside diameter of the toroidal seal ring 22, and by retainer plate 26 on the outside.

As illustrated in FIG. 1, vents 50,50' pass completely through their corresponding director plates 24,24', bulkhead plates 28,28' and retainer plates 26,26'. Vents 50,50' may be composed of rigid metal conduit throughout their lengths, and are rigidly and sealably attached to bulkhead plates 28,28' and director plates 24,24', thus serving to separate and connect them. Vents 50,50' operate to permit valved release of gas through dams 20,30, and in the preferred embodiment each permit a"bleed" of about 3.5 cfh of inert gas from the interior space 25 to the outside during the controlled purge phase of the method of the invention.

Rear dam 30 is very similar to front dam 20. The differences between the two are evident in FIGS. 1–3, and have mostly to do with the position of rear dam 30 relative to front dam 20. As illustrated in FIGS. 1–3, rear dam 30 is the positional reflection or reverse of front dam 20, so that director plate 24' on rear dam 30 faces inwardly toward the interior space 25, and rear retainer plate 26' is on the outside, opposite side, of rear bulkhead plate 28'. This reversed positional orientation also requires that rear purge line 32 and rear blow down line 34 "double back" on themselves, thereby passing through rear dam 30 not once, but twice. It is also noted that the gas lines associated with the front dam 20 (e.g. front purge line 38, front dam inflation line 44 and front blow down line 46) do not contact rear dam 30. This is in contradistinction to the rear purge line 32, rear blow down line 34 and rear dam inflation line 36, which pass through and contact front dam 20 en route to rear dam 30.

FIGS. 1, 2 and 5 show how front dam inflation line 44 passes through front retainer ring 26 only and sealably connects with front seal ring 22. FIG. 3 illustrates that rear dam inflation line 36 passes completely through front dam 20 en route to rear dam 30, where it passes through plates 24',28' and 26' and then returns through rear retainer plate 26' to sealably connect with rear seal ring 22'. FIGS. 1–6 illustrate that front blow down line 46 passes through the plates 24,26,28 of front dam 20 and terminates by opening within interior space 25. As shown in FIGS. 1 and 2, rear blow down line 34 likewise passes completely through front dam 20, continues on to pass through the plates 24',26',28' of rear dam 30, turns 180 degrees and again passes through rear dam 30 in reverse direction, also to terminate with an opening near the bottom of interior space 25.

Blow down lines 34,46 both preferably terminate with rigid arcuate segments, as shown in FIGS. 1–3, causing gas discharges therethrough to impinge directly against the bottom inside wall of the pipes 12,14. Similarly, vents 50,50' terminate in upwardly directed curved segments, as also shown in FIGS. 1–3, so that gas near the top of interior space 25 is the first to be vented through the dams 20,30. During the rapid blow down phase of the method of the invention, a long upper length of gap 16 is left unsealed to permit rapid venting of purged air.

Reference is returned to FIGS. 2 and 6, which aid in conveying an understanding of an advantage of the invention. Throughout the duration of the controlled (post-blow down) purge phase of the practice of the invention, the purge gas flows (at varying discharges) through purge lines 32 and 38. As most clearly illustrated in FIG. 6, (showing a section through front dam 20, but also representative of the structure and function of rear dam 30) the purge gas flows through purge orifice 64 in the center of bulkhead plate 28. It then impinges upon the solid barrier presented by director plate 24. Release from the pressure attributable the continuing flow through purge orifice 64 may be had only by the purge gas flowing through the annular gap between the periphery of director plate 24 and the inside wall of the pipe. This pattern of flow is shown by the directional arrows in FIG. 2, which shows purge gas flow patterns during the controlled purge phase of the practice of the invention.

Figure 7:
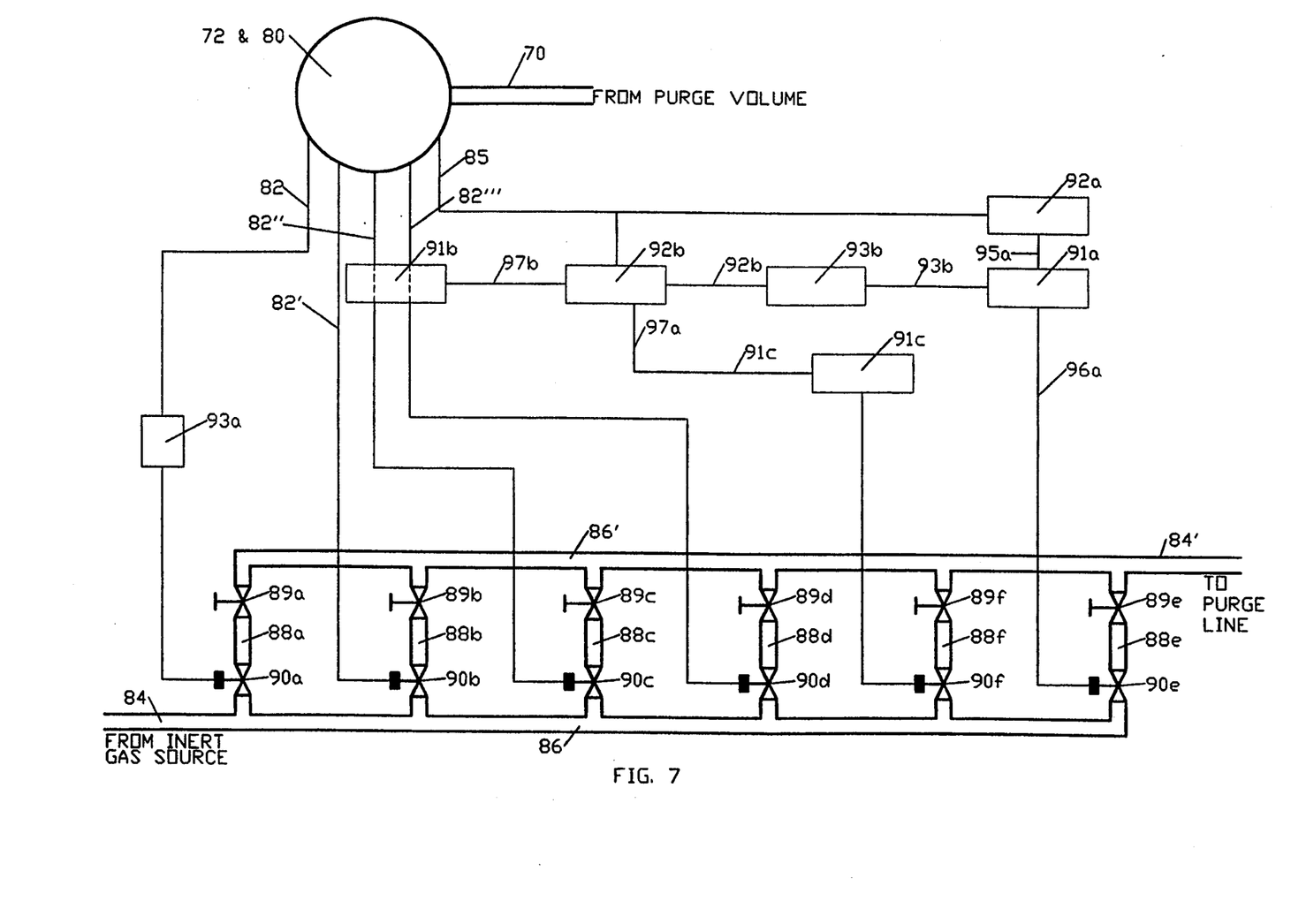
FIG. 7 is a schematic diagram illustrating the operational instrumentation of the preferred embodiment of the invention.

The flow of purging gas around the director plate 24 in the manner described induces the purge gas to continue flowing close to the inside walls of the pipes being joined. Accordingly, the principal movement of inert gas through interior space 25 during the controlled purge phase of the process is mostly adjacent to the pipe wall. The flow of pure inert gas is thus directed toward the immediate vicinity of the weld, where chemical stoichiometry is critical. This pattern of directed, pseudo-laminar flow is in contradistinction to indiscriminate, turbulent ejection of inert gas into interior space 25 from a randomly located point source. The flow pattern fostered by the configuration of the invention permits high-quality welds while minimizing total quantities of discharged inert gas. Costly inert gas is more efficiently used, reducing overall welding costs while assuring high quality welds. Reference is made to FIGS. 3 and 4, showing the disposition of pressure sensor line 70 which makes a sealed passage through front dam 20 and extends into interior space 25. Pressure sensor line 70 terminates in interior space 25 with sensor orifice 72. Pressure information is signalled pneumatically via pressure sensor line 70 to a flow controller unit 80 (FIG. 7). (Alternatively, an extremely sensitive piezometric device may be placed within interior space 25, and pressure information transmitted electrically to the control unit 80.) Within or connected to control unit 80 is a pressure sensor device, which may be any device known in the art for detecting and measuring extremely low gas pressure. The Photohelic TM Model 3000-00 Controller performs the function well.

Reference is made to FIG. 7, illustrating the use in the invention of a low range pressure-differential control unit 80. The control unit 80 monitors (via pressure sensor line 70) pressure fluctuations within interior space 25, and sends electrical signals through output leads 82,82',82'',82''' and 85 in response to pressure changes. When the pressure ascends or descends across any one of a plurality of pre-set thresholds (pre-programmed into control unit 80), an electronic signal is sent through a particular corresponding output lead 82. Output leads 82,82',82'',82''' and 85 preferably number at least five. Control unit 80 preferably has a pressure monitoring range, under ideal conditions, of 0.01 to 0.08 inches of water, but as high as 1.00 inches under adverse conditions of external (e.g., wind-induced) pressure. Through this specification, pressures shall be dimensioned in inches of water (relative to atmosphere). Control unit 80 contains electronic signal processing components whereby control unit 80 generates electric signals in specific corresponding output leads 82,82',82'',82''',85 in response to pressure data received via sensor line 70. A satisfactory commercially available sensing and control unit is the Photohelic TM Model 3000-00 Controller (pressure range 0.00–0.25 inches water). Alternatively, the Dwyer TM Model 607-0 Differential Pressure Transmitter (range 0.00–0.10 inches) may be used as sensor in conjunction with the Omega TM DP41E Process Indicator and Controller. Other satisfactory differential pressure transmitters, especially for use under adverse conditions of high wind, are Dwyer TM Model 607-1 (range 0.00–0.25 inches), Model 607-2 (0.00–0.50 inches) and Model 607-3 (range 0.00–1.00 inches). Control unit 80 and associated electrical circuitry preferably operate on 120 AC volts to ground, but alternatively can be DC or hybrid. With continued reference to FIG. 7, it is observed that argon or other purge gas is supplied to the system of the invention through a supply line 84 fitted with a standard pressure regulator (ordinarily set to about 60 psi). From supply line 84, the purge gas flows into a manifold 86, from which emerge a plurality of separate parallel valve lines 88a,88b,88c,88d,88e,88f. Valve lines 88a-f preferably number at least six. Within valve lines 88a-f are disposed needle valves 89a,89b,89c,89d,89e,89f and solenoid valves 90a,90b,90c,90d,90e,90f. Solenoid valves 90a-f are any fast-acting valves readily actuable by an electric solenoid connected thereto, for example, KIP #241116 Valve or Ascovalve. Needle valves 89a-f allow adjustment and temporary establishment of constant gas discharge through their respective valve lines 88a,88b,88c,88d,88e,88f. Solenoid valves 90a-f are in direct or indirect electrical connection with control unit 80 via corresponding output leads 82,82',82",82''' and 85, and thus function to open and close their respective valve lines 88a,88b,88c,88d,88e,88f upon receipt of signals from control unit 80.

Combined reference is made to FIGS. 1 and 7. Downstream from the needle and solenoid valves, valve lines 88a-f are joined by discharge manifold 86' into single supply line 84', which continues to a connection with rear purge line 32 and front purge line 38. Near dams 20,30, supply line 84' divides at a wye-joint to supply equal inert gas discharges into rear purge line 32 and front purge line 38. Accordingly, because inert purge gas flows through supply lines 84,84' via valve lines 88a-f to purge lines 32,38, the discharge through purge lines 32,38 is controllable by control unit 80.

The preferred embodiment of the apparatus of the invention incorporates various electrical relay and timing mechanisms for coordinated operation of solenoid valves 90a-f. Coordinated operation is achieved by regulating the signals passing from the control unit 80 to the various solenoid valves 90a-f via output leads 82,82',82",82''' and 85. Signal regulation is accomplished using relay assemblies comprising timing and latching features.

FIG. 7 is a schematic diagram illustrative of one preferred embodiment of the control system of this invention. This type of control is not limited to the specific number and type of elements shown in FIG. 7. Experiments have shown that at least two additional logic loops like 92a,91a,93b,92b may be advantageously employed for larger gap sizes than are specified in the present illustrative example. The illustrative needle valve 89a-e settings are the preferred settings for a linear root opening ⅛ to 3/16" wide by approximately 5" long. For consistent, routine use on one size of root opening, orifice plates may be substituted for preset needle valves.

Relays are of two types: (1) Quad pole, double throw latching relays 91a,91b,91c such as ECG brand RLY2065H (in this invention, normally closed); or (2) Double pole, double throw relays 92a,92b such as ECG brand RLY2045. All relays may be powered by 120 v AC, but power inputs have been omitted from FIG. 7 for clarity. Delay timers 93a,93b may be ECG brand RLY230. Solenoid valves 90a-f are KIP brand 241116, but any brand of normally closed, rapid acting solenoid valve is applicable. Five signal output leads from controller 80 are preferably used in this invention. Four of these are "rising pressure off" signal leads 82, 82', 82",82'''. For these signal leads when the pressure detected in interior space 25 rises past a pre-set threshold value, current from the controller 80 shuts off and the associated solenoid valve is closed by its spring. This action is reversed when the pressure drops below the threshold value. The one "rising pressure on" lead 85 sends current to the system when the pressure rises past the threshold value. In the embodiment of this invention, this current signal is used to activate relay and timer logic. The external power fed to the relays is thereupon used to activate the solenoids.

Continued reference to FIG. 7 first illustrates how the first output lead 82 is employed to operate valve 90a. Interposed in the output lead 82 is a simple RC timer 93a which is only activated by falling pressure. When the pressure first rises past the threshold value programmed in control unit 80 and corresponding to output lead 82 (for example, 0.03 in. water), the off signal is immediately transmitted to valve 90a. Whenever the pressure falls below the threshold value, the timer delays the on signal by a predetermined amount (e.g. 1 sec). Accordingly, a predefined time lag is consistently interposed between the transmission of the actuating signal from control unit 80 for opening the first solenoid valve 90a and the corresponding response (opening) of the valve.

The second signal output lead 82' is connected directly to the second solenoid valve 90b. Thus, when the pressure rises past the second programmed "set point," or threshold value (for example, 0.04 in. water), the current to the solenoid coil is cut off and the valve 90b is closed by its spring. When pressure drops below the threshold value, current is restored to the solenoid coil and valve 90b is opened immediately.

The third signal output lead 82" (illustrative pressure threshold value of 0.05 in. water) is connected to the third solenoid valve 90c via one pole of latching relay 91b. Relay acts as a normally closed switch until its internal solenoid is supplied with current to open it. Thus, signals flow from control unit 80 through the closed switch of relay 91b to valve 90c without delay or resistance as long as the coil of the relay 91b is not activated. This activation does not occur until the pressure has exceeded 0.06 in. water for the second time, as detailed hereafter.

The fourth signal output lead 82''' (illustrative threshold value 0.06 in. water) is connected to the fourth solenoid valve 90d via another pole of normally closed latching relay 91b. The signal also operates directly on the valve until a pressure of 0.06 in. of water is reached a second time.

The fifth signal output lead 85 (illustrative threshold value 0.06 in. water) operates the fifth solenoid valve 90f and the sixth solenoid valve 90e through the mediation of relay and timer loop 92a, 91a, 93b, 92b and, for valve 90f, also relay 91c. Output lead 85 also serves to close valves 90c and 90d after pressure has risen above its threshold value a second time, as described hereafter.

When the threshold value for output lead 85 is passed for the first time, electrical current closes isolation relay 92a, sending the external voltage signal to latching relay 91a via line 95a. (One pole of relay 91a had been closed and feeding current to valve 90e, but the activation of relay 91a opens circuit 96a and allows valve 90e to close.) Relay 91a is latched, so valve 90e cannot open until the system is reset.

Another pole of relay 91a is connected to supply current via line 96b when the relay is activated. This starts delay timer 93b (set for 1 to 5 seconds) after which time current passes on to close relay 92b. Current to the coil of relay 92b remains on until system reset because this current originates in latched relay 91a. With relay 92b closed, current can pass through the poles of this relay from output lead 85. However, the time delay after the first rising pressure cycle is sufficient for pressure to have dropped past the threshold value before relay 92*b*closes. The effect on valve 90*f* is as follows: During the first rising pressure cycle, the solenoid at valve 90*f* is powered from the external source connected to latching relay 91*c* through the closed contacts of that relay. Since current cannot pass through line 97*a* during the time delay period, relay 91*c* is unaffected by the short period of time detected pressure is above the threshold value for output lead 85. Thus valve 90*f* remains open through the first rising pressure cycle, through the first decreasing pressure cycle, and well into the second rising pressure cycle. However, once the threshold value for output lead 85 is passed upward the second time, current flows through line 97*a* to relay 91*c* opening and latching the relay and therefore closing solenoid valve 90*f* by depriving it of electrical energy.

The current flowing through the contacts of relay 92*b*also flows along line 97*b* to latching relay 91*b*, opening and latching the latter device. Since signals from the controller 80 to valves 90*c* and 90*d* flow through the contacts of relay 91*b*, these valves are also deprived of any subsequent electrical current signals and remain closed until the system is reset.

Reset is accomplished by momentarily depressing a button switch (not shown) which cuts off power momentarily to all devices in the system, thus permitting normally closed relays and switches to reclose and resetting timers.

In the preferred embodiment, no relay assembly is mounted within the second output lead 82'. The second solenoid valve 90*b* is actuated directly by control unit 80.

Needle valves 89*a-f* are adjustable volumetric discharge controls. Prior to practicing the invention, the operator presets each valve to a particular discharge depending on the area of gap 16. Valves 89*a-f* are set to allow incremental adjustments to the total discharge by the opening and closing of various combinations of solenoid valves 90*a-f*. The settings on all the needle valves 89*a-f* collectively must permit their total combined discharge (when all the solenoid valves 90*a*-90*e* are open) to equal the discharge through supply line 84. By way of non-limiting example, in the preferred embodiment the first needle valve 89*a* is set at 5 cfh, the second valve 89*b* is set at 5 cfh, and the third and fourth 89*c*,89*d* are also set at 5 cfh. Optimal operation suggests that the sixth needle valve 89*e* be set at 25 cfh, and the fifth 89*f* is set to 10 cfh.

The method of the invention includes the use of the apparatus of the invention to frequently and incrementally adjust purge gas flow rates into interior space 25 in order to better correspond purge gas injection discharges to purge gas venting discharges as welding progresses. Initially, front pipe 12 is situated adjacent to rear pipe 14, as shown in FIGS. 1-3. Rear dam 30 and front dam 20, connected by the gas lines 32,34,36, are manipulated into place on either side of gap 16. (Alternatively, the various gas lines may be sealably connected to the dams 20,30 after the dams have been properly positioned.) Pressurized gas, preferably inert, is then pumped through front dam inflation line 44 to inflate front seal ring 22. Rear seal ring 22' is likewise concurrently or consecutively inflated via rear dam inflation line 36. Thus inflated, seal rings 22,22' seal off interior space 25 and secure dams 20,30 in place by frictional contact with pipes 12,14.

Control unit 80 and needle valves 89*a-f* are pre-programmed and pre-set prior to the initiation of purge gas flow. Control unit 80 is programmed with a plurality of specified pressure thresholds, such that detection of any particular threshold pressure value within interior space 25 (via sensor line 70) triggers a signal from a particular corresponding output lead 82,82',82",82'" or 85. Needle valves 89*a-f* are each set to dictate a specified constant gas discharge through the corresponding valve lines 88*a-f*. The threshold pressure values programmed into control unit 80, and the various needle valve settings, depend mainly upon the area of gap 16.

As a general guide, threshold pressure values should be programmed in control unit 80 at uniformly separated increments of, say, one-hundredths of an inch of water. By way of non-limiting example, in the preferred embodiment the threshold value corresponding to the first output lead 82 is programmed to be 0.03 inches; for the second output lead 82', 0.04 inches; for the third output lead 82",0.05 inches; and for the fourth and fifth output leads 82'" and 85, 0.06 inches of water. Needle valve settings should permit several small incremental and decremental discharge variances, and a pair of larger decremental changes, in total purge gas flow through supply line 84 as various individual valve lines 88*a-f* are valved on and off by solenoid valves 90*a-f*. Prior to establishing a controlled flow regime for welding, a rapid "blow down" purge is performed. The flow of inert gas during the blow down phase is depicted by the directional arrows in FIG. 1. The purpose of the blow down is to rapidly and thoroughly expel all reactive gas from within interior space 25 before any welding is initiated. The bottom half of the circumference of gap 16 is sealed with duct tape, leaving open the upper half of the gap circumference (about 10 lineal inches on a 6-inch pipe). Valve(s) between blow-down lines 34,46 and a pressurized inert gas source are opened to allow approximately 80 cfh of inert purge gas to blow through blow down lines 34,46 and into interior space 25. This blow down process, which with the preferred embodiment of the invention may require only one minute for a six-inch pipe, forces reactive gas from interior space 25 out through the unsealed length of gap 16. Gases escaping through gap 16 are monitored for reactive gas (oxygen) content. When exiting gas is determined to be below a specified reactive gas content (e.g. 1% oxygen), approximately half of gap 16 is sealed off and one quadrant is opened. Interior space 25 is deemed to be purged, and the blow down flow through blow down lines 34,46 valved off and controlled flow through purge lines 32,38 commenced.

It is noted that an advantage of the invention is a rapid and thorough blow down resulting from oppositely disposed dual blow down lines 32,46. By directing purge gas rapidly from more than one direction, particularly from opposite sides of the gap 16 from which reactive gases are vented, the venting through gap 16 occurs quickly, with reduced tendency for reactive gases to become entrapped in one end of interior space 25. The interior space 25 is purged from both ends, with bidirectional flow toward the middle for expulsion from gap 16. In systems employing blow down in a single direction only, there is some tendency for the inert purge gas to flow from its source at one end an interior space 25 directly to a gap or vent, without thoroughly purging the entire interior space 25.

After blow down is completed, the flow of inert gas through blow down lines 34,46 is valved off, and an approximately 55 cfh flow is initiated through supply lines 84,84' to purge lines 32,38. The direction of inert gas flow during the controlled purge phase of the process is depicted by the directional arrows shown in FIG. 2. At this time, pressure in the interior space 25 is minimal, and all the solenoid valves 90a–f are open for maximum controlled purge flow. Welding of the gap 16 is commenced. As flow continues into the interior space 25, and the length of the open gap 16 is reduced by welding, the pressure detected at sensor orifice 72 reaches the programmed threshold corresponding to first output lead 82, whereupon a signal is sent by control unit 80 to first relay assembly 93a. The signal prompts closure of first solenoid valve 90a thereby terminating discharge through valve line 88a and incrementally reducing the flow through supply line 84' to purge lines 32,38 for so long as the detected pressure remains above the first threshold value.

If the reduced discharge causes pressure in interior space 25 to fall back to the first threshold pressure value, the control unit 80 detects the descent and sends a second signal to first relay assembly 93a, which, after a fixed delay, opens solenoid valve 90a and restores flow in the first valve line 88a (which will cause pressure in space 25 to again rise). There is no established limit to the number of open-close cycles through which first solenoid valve 90a may pass.

The second output lead 82' circuit functions very similarly to the first, except that it operates without any timed delays. As welding of the root bead continues, the detected pressure rises to the corresponding second threshold pressure value (which is always higher than the first threshold value). The second solenoid valve 90b closes and remains closed until the detected pressure in space 25 falls below the second programmed threshold. Thus, flow through second valve line 88b occurs when pressure in interior space 25 is below the programmed second threshold pressure, but is terminated by control unit 80 whenever that pressure value is exceeded (which is typically most of the duration of the welding process).

As uninterrupted flow continues through the third through sixth valve lines 88c–f, and as the weld further progresses, the pressure detected at the orifice 72 of sensor line 70 continues to rise. When the detected pressure reaches the programmed threshold pertaining to the third output lead 82'',(which threshold is higher than the second threshold pressure), control unit 80 sends a signal through relay assembly 91b which closes third solenoid valve 90c, again incrementally reducing the total flow through supply line 84' to purge lines 32,38.

Closure of the third solenoid valve 90c reduces the rate of pressure increase, but the detected pressure continues to rise as the flow through higher-discharge fifth and sixth valve lines 88e and 88f continues unabated. The combination of relay 91b and its associated solenoid valve 90d function just like the relay 91b and valve combination 90c, except that valve 90d is responsive to signals from control unit 80 that are triggered by the detection of a still higher fourth threshold pressure. This distinction is manifested by the location of relay 91b on the fourth output lead 82'''. When the detected pressure attains the fourth programmed threshold pressure value, the fourth solenoid valve 90d closes.

Because it is indirectly responsive to signals through the fifth output lead 85 attributable to detected pressures equalling or exceeding the fourth programmed threshold value, the fifth solenoid valve 90f closes simultaneously with the fourth solenoid valve 90d; because of the engagement of the latching element of the relay assembly 91a, however, the sixth solenoid valve 90e remains closed, and will not reopen even if detected pressure descends below the fourth threshold value, as previously explained.

The concurrent closure of solenoid valves 90d and 90f reverses the rate of pressure change in the interior space 25. As the pressure descends to the fourth threshold value, a signal from control unit 80 causes the fourth solenoid valve 90d to open, incrementally increasing discharge through supply line 84'. The detected pressure continues to fall, but flow through the third, then second, valve lines 88c and 88b is restored when the detected pressure descends to the third and second threshold values, respectively, and the control unit 80 signals the actuation of the third and second solenoid valves 90c and 90b. When the detected pressure descends nearly to the first threshold value, the pressure drop is arrested by the continuing closure of the root bead, and the pressure in interior space 25 inevitably begins to rise again as flow continues through the unclosed valve lines 88b–d and 88f. (Valve line 88a normally not having been opened, and valve lines 88b–d having been shut while the pressure was rising, but then re-opened as it dropped. The fifth valve line 88f remains open, despite the previous attainment of the fourth threshold value, due to the timed delay of the actuation of its latching relay 91c. The sixth valve line 88e was closed to stay when the detected pressure first attained the fourth threshold value and relay 91a was latched.)

A second cycle of ascending detected pressure commences, and follows the same order with generally the same effects, except that when the third and fourth threshold values are attained a second time, the third, fourth, and fifth solenoid valves 90c,90d,90f close and remain closed as a function of the timer and latch features of their corresponding circuits. A second ascension of the detected pressure past the fourth threshold value triggers a signal from control unit 80 which closes the fifth solenoid valve 90f. It is noted that when the detected pressure attains the fourth threshold value a second time, the first four solenoid valves 90a–d will be closed.

With the closure of the fourth solenoid valve 90f, discharge through supply line 84' is completely arrested. The pressure in the interior space 25 will drop as inert gas escapes through the gap 16 and through vents 50,50'. Detected pressure drops, but the third through sixth solenoid valves 90c–f do not reopen as their corresponding threshold pressure values are detected, due to the latching aspect of their respective relay assemblies 91a–c.

When the pressure again drops below the second threshold pressure value, the second solenoid valve 90b opens to increase flow, and when and if pressure descends to the first threshold value, the first solenoid valve 90a also opens after a time delay. The quarter length of root bead is approaching closure, and a slightly broader pressure range is provided by the timer element of the first relay assembly 93a to avoid unacceptable deformations of the root bead.

Upon completion of the first quarter circumference of the gap 16, the second quarter circumference of duct tape is removed, the control unit 80 and the relay assemblies 91a–c are reset and the process is repeated. The process is repeated a third and fourth time in order to complete the complete circumference of the pipe.

Example (Industrial Applicability)

The invention is further illustrated by the following nonlimiting example:

The invention was practiced on six-inch stainless steel pipe segments having root openings about ⅛ inch to 3/16 inch wide. For the six-inch pipe of this example, the needle valve settings were fixed to produce flows of 25 cfh in the sixth needle valve 89e, then 10 cfh in the fifth needle valve 89f, and 5 cfh in each of the first four needle valves 89a–d. Threshold pressure settings on the control unit 80 were set at 0.03, 0.04, 0.05 and 0.06 (for output leads 82''' and 85) inches water. The timer element 93a on output lead 82 was set for 1.0 second and the timer element 93b for the relay assemblies 92a, 91a, 92b, 91b and 91c was set for 2.0 seconds. The top two quadrants (about ten lineal inches) of the gap 16 were left open, and the rest sealed with duct tape.

A high flow blow down (separate line) of 80 cfh for 60 seconds reduced the oxygen content within the interior space 25 to below one percent, whereupon one of the open quadrants of the gap 16 (about five lineal inches) was sealed with duct tape. Blow down lines 34,46 were then closed. At the same time, the control unit 80 was reset to begin flow for welding. At this point, solenoid valves 90a–f were all open, and the back pressure was about 0.01 inch water.

The controlled purge phase was commenced by opening vents 50,50', purge lines 32,38 and supply line 84, to allow 55 cfh purge gas to flow through supply line 84'. Welding was initiated. As welding of the root bead progressed, the detected pressure rose to 0.03 inches, and the control unit 80 cut off the first 5 cfh valve line 88a. With further welding, the sensed pressure passed 0.04 inches, and the control unit cut off the second 5 cfh valve line 88b. Similarly, the control unit 80 cut off another 5 cfh valve line 88c as the pressure passed 0.05 inches, and yet another 88d at 0.06 inches water. At this time, the solenoid valve 90e in the 25 cfh valve line 88e was latched off, and 10 cfh of flow continued through the fifth valve line 88f.

A 5 cfh flow through the fourth valve line 88d came back on when the pressure dropped below 0.06 inches, another 5 cfh through the third valve line 88c was restored when the pressure fell to 0.05 inches, and yet another 5 cfh flow returned through the second valve line 88b at 0.04 inches.

At a detected pressure only slightly above 0.03 inches, the pressure decrease was arrested by the continuing closure of the root bead, and the pressure again began to rise. On the second "up cycle," the 5 cfh flow through the second valve line 88b was again cut off at 0.04 inches, and the flow through the third valve line 88c terminated again when the detected pressure attained 0.05 inches. When 0.06 inches pressure was reached in the second "up cycle," the final 5 cfh line 88d and the 10 cfh line 88f were cut off. On this second cycle, as the detected pressure again dropped below 0.04 inches, the second 5 cfh line 88b opened and stayed on, and at pressure below 0.03 inches the first 5 cfh line 88a opened after the timed delay. At this time, the unsealed quarter was approaching closure, and a broader pressure range was desirable to avoid back-pressure deformation of the root bead. The detected pressure thereafter ranged from about 0.02 inches to about 0.035 inches, as the second solenoid valve 90b repeatedly opened and closed to maintain an average flow of 7 cfh permitted through the vents 50,50'.

After the first quarter of root bead had cooled, the invention system was reset to the initial 55 cfh and the next segment of tape (e.g. the tape sealing the second quarter circumference) was removed. The process was repeated for the second quarter, and then the third quarter, and finally the final quarter of the pipe gap circumference. When the root bead was completed throughout the circumference, the 7 cfh flow was continued until the subsequent beads were completed.

The preceding example can be repeated with similar success by substituting the generically or specifically described operating conditions and settings of this invention for suitable alternatives. It was determined that, under most conditions, the indicated threshold pressure values are appropriate for many sizes of pipe, provided that the arcuate segments being welded are about five lineal inches with an ⅛ to 3/16 inch abutment gap. For longer segments or wider gaps, the number of weld segments or pressure steps can be increased.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A welding gas purging apparatus comprising:
   at least two gas dams situated on opposite sides of a gap to be welded; and
   means for supplying a gas flow toward the gap from opposite sides of the gap.

2. The apparatus of claim 1 wherein said gas dams comprise inflatable seals.

3. The apparatus of claim 1 wherein said gas dams are disposed within sections of pipe.

4. The apparatus of claim 1 wherein said means for supplying gas flow comprises at least two purge gas lines for bidirectionally injecting gas into a space between said gas dams.

5. The apparatus of claim 4 wherein said purge gas lines pass through at least one of said gas dams and comprise termini within said space between said dams.

6. The apparatus of claim 3 wherein said means for supplying gas flow comprises means for directing gas flow parallel and adjacent to the interior walls of the sections of pipe.

7. The apparatus of claim 6 wherein said directing means comprises director plates disposed within said space and upon said gas dams.

8. A method of gas purging for welding, comprising the steps of:
   a) situating gas dams on opposite sides of a gap to be welded; and
   b) supplying gas flow toward the gap from opposite sides of the gap.

9. The method of claim 8 wherein the step of situating the gas dams comprises the step of inflating seals.

10. The method of claim 8 wherein the step of situating the gas dams comprises the step of disposing the dams within sections of pipe.

11. The method of claim 8 wherein the step of supplying gas flow comprises the step of bidirectionally injecting gas into a space between the gas dams.

12. The method of claim 11 wherein the step of bidirectionally injecting comprises the steps of passing at least one purge gas line through each of the gas dams and terminating the purge gas lines within the space between the dams.

13. The method of claim 10 wherein the step of supplying gas flow comprises the step of directing gas flow parallel and adjacent to the interior walls of the pipe sections.

14. The method of claim 13 wherein the step of directing gas flow comprises propelling gas around the peripheries of director plates mounted within the space and upon each of the gas dams.

15. A method for purging gas from pipes during welding comprising the steps of:
   a) disposing two gas dams in pipes on opposite sides of a gap to be welded;
   b) sealably enclosing an interior space between the dams;
   c) introducing a bidirectional flow of gas into the interior space from opposite sides of the gap via at least two purge gas lines connected to a supply line;
   d) venting gas from the interior space via the gap;
   e) commencing to weld the gap;
   f) detecting the pressure within the interior space; and
   g) incrementally adjusting the discharge of gas into the interior space in response to pressure fluctuations detected in the interior space.

16. The method of claim 15 wherein the step of incrementally adjusting the discharge of gas comprises the steps of opening and closing at least two valve lines disposed within the supply line.

17. The method of claim 16 wherein the step of detecting the pressure within the interior space comprises the step of receiving pressure data through a pressure sensor line.

18. The method of claim 17 comprising the further steps of:
   a) connecting the sensor line with a control unit having at least two output leads.
   b) programming the control unit with at least two threshold pressure values;
   c) assigning an output lead to each threshold pressure value; and
   d) connecting each output lead to a corresponding valve disposed within a valve line.

19. The method of claim 18 wherein the steps of opening and closing valve lines are performed in response to signals to the valves from the control unit.

20. The method of claim 19 comprising the further step of regulating the signals.

21. The method of claim 20 comprising the step of actuating at least one relay on at least one output lead.

22. The method of claim 21 further comprising at least one member from the group consisting of timing the signals, delaying actuation of the relays, and latching the relays to prohibit actuation.

23. The method of claim 17 comprising the further step of establishing a uniform gas discharge through each valve line.

24. An apparatus for purging gas from pipes during welding, said apparatus comprising:
   at least two gas dams disposed in the pipes on opposite sides of a gap to be welded;
   means for sealably enclosing an interior space between said dams;
   at least two purge gas lines for introducing a bidirectional flow of gas into the interior space from opposite sides of the gap;
   means for venting gas from the interior space;
   a gas supply line connected to said purge gas lines;
   a pressure sensor connected to the interior space; and
   means for incrementally adjusting the discharge of gas into the interior space in response to pressure fluctuations detected in the interior space.

25. The apparatus of claim 24 wherein said incremental adjustment means comprises at least two valve lines disposed within said supply line.

26. The apparatus of claim 25 further comprising at least one independently operable valve mounted within each said valve line.

27. The apparatus of claim 26 further comprising means for automatically signalling said valves when said pressure sensor detects threshold pressures within said interior space.

28. The apparatus of claim 27 wherein said automatic signalling means comprises:
   a programmable control unit connected to said pressure sensor; and
   output leads connecting each said valve with said control unit.

29. The apparatus of claim 28 wherein each said valve comprises solenoid means for actuating said valve in response to signals from said control unit.

30. The apparatus of claim 29 further comprising means for regulating said signals.

31. The apparatus of claim 30 wherein said regulating means comprises at least one relay assembly upon at least one said output lead.

32. The apparatus of claim 31 wherein said relay assembly comprises at least one member from the group consisting of an electrical relay, a timer, and a latching relay.

33. The apparatus of claim 24 further comprising means for establishing a uniform gas discharge through each said valve line.

34. The apparatus of claim 33 wherein said establishing means comprises at least one needle valve.

35. A gas dam apparatus for welding a section of pipe, comprising:
   a bulkhead plate;
   a retainer plate disposed parallel to said bulkhead plate; and
   an inflatable toroidal seal disposed between said bulkhead plate and said retainer plate; and
   means for directing gas flow parallel and adjacent to an interior wall of said section of pipe.

36. The apparatus of claim 35 further comprising at least two conduit line means for injecting gas through said dam apparatus.

37. The apparatus of claim 36 wherein at least one said line means for injecting connects said dam apparatus with a second gas dam apparatus.

38. The apparatus of claim 35 wherein said means for directing gas flow comprises a director plate disposed parallel to said bulkhead plate.

39. A gas purging apparatus for welding, comprising:
   two gas dams disposed within sections of a pipe, each said gas dam comprising
   a bulkhead plate;
   a seal, inflatable against one said pipe section and disposed adjacent to said bulkhead plate; and
   means for directing gas flow parallel and adjacent to the interior wall of one said pipe section; and
   at least one gas line connecting said two dam apparatuses.

* * * * *

UNITED STATES PATENT AND TRADEMARK OFFICE
CERTIFICATE OF CORRECTION

PATENT NO. :    5,390,846

DATED      :    February 21, 1995

INVENTOR(S):    Jonathan E. Thode

It is certified that error appears in the above-identified patent and that said Letters Patent is hereby corrected as shown below:

Item [76],

On coversheet, change Inventor to:

Jonathan E. Thode, 201 Conway,
    Las Cruces, New Mexico  88005

Signed and Sealed this

Second Day of January, 1996

Attest:

BRUCE LEHMAN

Attesting Officer     Commissioner of Patents and Trademarks